United States Patent [19]

Nemirovsky

[11] Patent Number: 5,857,094
[45] Date of Patent: Jan. 5, 1999

[54] IN-CIRCUIT EMULATOR FOR EMULATING NATIVE CLUSTRUCTION EXECUTION OF A MICROPROCESSOR

[75] Inventor: Mario D. Nemirovsky, San Jose, Calif.

[73] Assignee: National Semiconductor Corp., Santa Clara, Calif.

[21] Appl. No.: 827,581

[22] Filed: Mar. 28, 1997

Related U.S. Application Data

[62] Division of Ser. No. 451,503, May 26, 1995, abandoned.

[51] Int. Cl.$^6$ ...................................................... G06F 9/455
[52] U.S. Cl. .......................... 395/500; 395/500; 209/166
[58] Field of Search ............................................. 395/500

[56] References Cited

U.S. PATENT DOCUMENTS

| 4,674,089 | 6/1987 | Poret et al. | 395/183.04 |
|---|---|---|---|
| 4,926,323 | 5/1990 | Baror et al. | 395/375 |
| 5,189,319 | 2/1993 | Fung et al. | 307/452 |
| 5,204,953 | 4/1993 | Dixit | 395/400 |
| 5,222,240 | 6/1993 | Patel | 395/394 |
| 5,226,047 | 7/1993 | Catlin | 371/16.2 |
| 5,241,631 | 8/1993 | Smith et al. | |
| 5,254,888 | 10/1993 | Lee et al. | 307/480 |
| 5,259,006 | 11/1993 | Price et al. | 375/107 |
| 5,321,828 | 6/1994 | Phillips et al. | 395/500 |
| 5,404,473 | 4/1995 | Papworth et al. | 395/375 |
| 5,408,626 | 4/1995 | Dixit | 395/400 |
| 5,440,747 | 8/1995 | Kiuchi | |
| 5,442,757 | 8/1995 | McFarland et al. | 395/375 |
| 5,481,689 | 1/1996 | Stamm et al. | 395/412 |
| 5,542,058 | 7/1996 | Brown, III et al. | 395/375 |
| 5,564,041 | 10/1996 | Matsui et al. | 395/500 |

(List continued on next page.)

FOREIGN PATENT DOCUMENTS 02103482  4/1990  Japan .

OTHER PUBLICATIONS

Weiss, "PowerPC goes after X86PCs and embedded system" 7 Jun. 1994, pp. 32–37, Computer Design.
Brewer, et al. "A Single–Chip Digital Signal Processing Subsystem" 21 Jan. 1994, vol. 6, pp. 265–272, International Conference on Wafer Scale Integration.
Serra, Micaela & Dervisoglu, Bulent I, "Testing", Chapter 79, *The Electrical Engineering Handbook,* Richard C. Dorf, Editor–in–Chief, CRC Press, Inc., 1993, pp. 1808–1837.
"8237A High Performance Programmable DMA Controller (8237A,8237A–4, 8237A–5)", *Peripheral Components,* Intel, 1992, pp. 3–14 thru 3–50.

(List continued on next page.)

*Primary Examiner*—Kevin J. Teska
*Assistant Examiner*—M. Irshadullah
*Attorney, Agent, or Firm*—Limbach & Limbach LLP

[57] ABSTRACT

An integrated circuit (IC) includes multiple circuits and functions which share multiple internal signal buses, three physical and five logical, according to distributed bus access and control arbitration. The multiple internal signal buses are shared among three tiers of internal circuit functions: a central processing unit and a DMA controller; a DRAM controller and a bus interface unit; and peripheral interface circuits, such as PCMCIA and display controllers. Two of the physical buses correspond to two of the logical buses and are used for communications within the IC. The third physical bus corresponds to three of the logical buses and is used for communications between the IC and circuits external to the IC. Arbitration for accessing and controlling the various signal buses is distributed both within and among the three tiers of internal circuit functions. Maximum performance is thereby achieved from the circuit functions accessed most frequently, while still achieving high performance from those circuit functions accessed less frequently. The IC may provided with a processor core with features that support In-Circuit Emulation (ICE).

12 Claims, 11 Drawing Sheets

Microfiche Appendix Included
(5 Microfiche, 320 Pages)

U.S. PATENT DOCUMENTS

| | | | |
|---|---|---|---|
| 5,574,892 | 11/1996 | Christensen | 395/500 |
| 5,603,017 | 2/1997 | Intrater et al. | |
| 5,608,881 | 3/1997 | Masumura et al. | |
| 5,619,726 | 4/1997 | Seconi et al. | |
| 5,619,728 | 4/1997 | Jones et al. | |
| 5,630,102 | 5/1997 | Johnson et al. | 395/500 |

OTHER PUBLICATIONS

Kane, Gerry, "R2000 Processor Programming Model", Prentice Hall, 1989, Chapter 2, *MIPS RISC Architecture,* MIPS Computer Systems, Inc.

Intel Corporation, *i486 Micro Processor Hardware Reference Manual,* Intel, 1990, Processor Bus, pp. 3–28 thru 3–32.

L–T Wang et al., "Feedback Shift Registers For Self–Testing Circuits", *VLSI Systems Design,* Dec. 1986.

Masakazu Shoji, "CMOS Dynamic Gates", Chapter 5, *AT&T CMOS Digital Circuit Technology,* Prentice Hall, 1988, pp. 210–257.

Guthrie, Charles, "Power–On Sequencing For Liquid Crystal Displays; Why, When, And How", *Sharp Application Notes,* Sharp Corporation, 1994, pp. 2–1 thru 2–9.

Bernd Moeschen, "NS32SP160—Feature Communication Controller Architecture Specification", *National Semiconductor,* Rev. 1.0, May 13, 1993.

Agarwal, Rakesh K., *80x86 Architecture and Programming, vol. II: Architecture Reference,* Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A–4, 8237–5)", *Peripheral Components,* Intel, pp. 3–14 thru 3–50.

Kane, Gerry, "R2000 Processor Programming Model", Chapter 2, *MIPS RISC Architecture,* MIPS Computer Systems, Inc.

Hennessy, John et al., "Interpreting Memory Addresses", *Computer Architecture A Quantitative Approach,* pp. 95–97, Morgan Kaufmann Publishers, Inc., 1990.

*Power PC601 Reference Manual,* IBM, 1994, Chapter 9, "System Interface Operation", pp. 9–15 thru 9–17.

Intel Corp. Microsoft Corp., *Advanced Power Management (APM) BIOS Interface Specification,* Revision 1.1, Sep. 1993.

Intel Corporation, *i486 Micro Processor Hardware Reference Manual,* Processor Bus, pp. 3–28 thru 3–32.

IN-CIRCUIT EMULATOR FOR EMULATING NATIVE CLUSTRUCTION EXECUTION OF A MICROPROCESSOR

This is a divisional of application Ser. No. 08/451,503 filed May 26, 1995, now abandoned.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

Appendix A is microfiche (five sheets containing a total of 302 frames) containing copyrighted material, Copyright 1995, National Semiconductor Corporation, consisting of a C-language code listing for a CPU design for an integrated circuit in accordance with the foregoing discussion.

1. Field of the Invention

The present invention relates to integrated circuits containing a central processing unit and a number of peripheral circuit functions, and in particular, to such integrated circuits wherein the central processing unit and peripheral circuit functions communicate both among themselves and with external circuit functions.

2. Description of the Related Art

Due to the need for backwards compatibility with older generations, the x86 is one of the most complex instruction set architecture (CISC) microprocessors. For example, the large and complex i486 has over 400 instructions that must be implemented to maintain backward compatibility with the older generation x86 processors. Such complexity has resulted in few compatible processors or controllers which are suitable, e.g. simple in design, small in size and low in cost, for use in embedded control applications. Accordingly, it would be desirable to have a processor or controller which is x86-compatible and yet suitable for low cost embedded control applications.

SUMMARY OF THE INVENTION

An integrated circuit in accordance with the present invention includes multiple circuits and functions which share multiple internal signal buses according to distributed bus access and control arbitration. This provides for achieving maximum performance from the circuit functions, both internal to and external from such integrated circuit, which are accessed most frequently, while still providing for achievement of high performance from internal and external circuit functions which are accessed less frequently.

An integrated circuit (IC) with multiple circuit functions and signal buses in accordance with one embodiment of the present invention includes three signal buses, a set of master controllers and two sets of peripheral circuits. The first signal bus is for communicating a first set of bus signals within the IC, the second signal bus is for communicating a second set of bus signals within the IC, and the third signal bus is for coupling to an external circuit and communicating a third set of bus signals between the IC and such external circuit. The master controllers are coupled to the first signal bus and are for selectively accessing the first signal bus and controlling communication of the first set of bus signals. One set of peripheral circuits is coupled to the first, second and third signal buses and is for selectively communicating with the master controllers via the first signal bus and first set of bus signals, selectively accessing the second signal bus and controlling communication of the second set of bus signals, and selectively accessing the third signal bus and controlling communication of the third set of bus signals. The other set of peripheral circuits is coupled to the second signal bus and is for selectively communicating with the first set of peripheral circuits via the second signal bus and second set of bus signals.

An integrated circuit (IC) with multiple circuit functions interconnected by and sharing multiple signal buses according to distributed bus access and control arbitration in accordance with another embodiment of the present invention includes a set of signal buses, a set of master controllers and two sets of peripheral circuits. The signal buses are for communicating a set of bus signals. The master controllers are coupled to a first subset of the signal buses and are for communicating with one another and in accordance therewith determining which one thereof becomes a bus master having access to and control of a first one of the signal buses and in accordance therewith controlling communication of a first subset of the bus signals. One set of peripheral circuits is coupled to the first subset and a second subset of the signal buses. These peripheral circuits are for communicating with one another and in accordance therewith determining which one thereof communicates with the bus master and gains access to and control of a second one of the signal buses and in accordance therewith communicating with the bus master and controlling communication of a second subset of the bus signals. The other set of peripheral circuits is coupled to a third subset of the signal buses. These other peripheral circuits are for communicating with one another and in accordance therewith determining which one thereof gains access to a third one of the signal buses and in accordance therewith communicating a third subset of the bus signals.

In accordance with a further embodiment of the present invention, a microprocessor that executes instructions to process data in accordance with periodic cycles of a microprocessor system clock includes an execution stage, a decode stage and a writeback stage. The execution stage references instructions and operands utilized in executing instructions, executes the instructions to generate results, and computes memory addresses utilized in retrieving the instructions and operands from storage and in writing results to storage. The decode stage retrieves instructions referenced by the execution stage, decodes the retrieved instructions into a form that can be utilized by the execution stage and provides the decoded instructions to the execution stage. The writeback stage writes results to storage at memory addresses computed by the execution unit.

In accordance with a still further embodiment of the present invention, a microprocessor that executes instructions to process data in accordance with periodic cycles of a microprocessor system clock includes an execution stage, a decode stage and a writeback stage. The execution stage includes an execution unit that utilizes microcode instructions and operands to perform arithmetic and logic operations to generate results, and that computes memory addresses utilized in retrieving the instructions and operands and in writing results to storage. The execution stage further includes a register file that stores operands utilized by the execution unit and that responds to specified read memory addresses by providing an operand from a register file storage location corresponding to the specified read memory address, and that responds to specified write memory address by storing an operand to a register file storage location corresponding to the specified write memory address. The decode stage includes a prefetch unit that retrieves instructions from storage, a decode unit that decodes the retrieved instructions into a form that can be utilized by the execution unit, and a microsequencer unit that provides a sequence of one or more microcode instructions corresponding to a decode instruction. The writeback stage includes a bus interface unit that responds to an external read memory address by retrieving either an instruction or an operand corresponding to the external read memory address from storage external to the microprocessor, and that responds to an external write memory address by storing a result corresponding to the external write memory address to storage external to the microprocessor.

These and other features and advantages of the present invention will be understood upon consideration of the following detailed description of the invention and the accompanying drawings.

DETAILED DESCRIPTION OF THE INVENTION

Figure 1A:
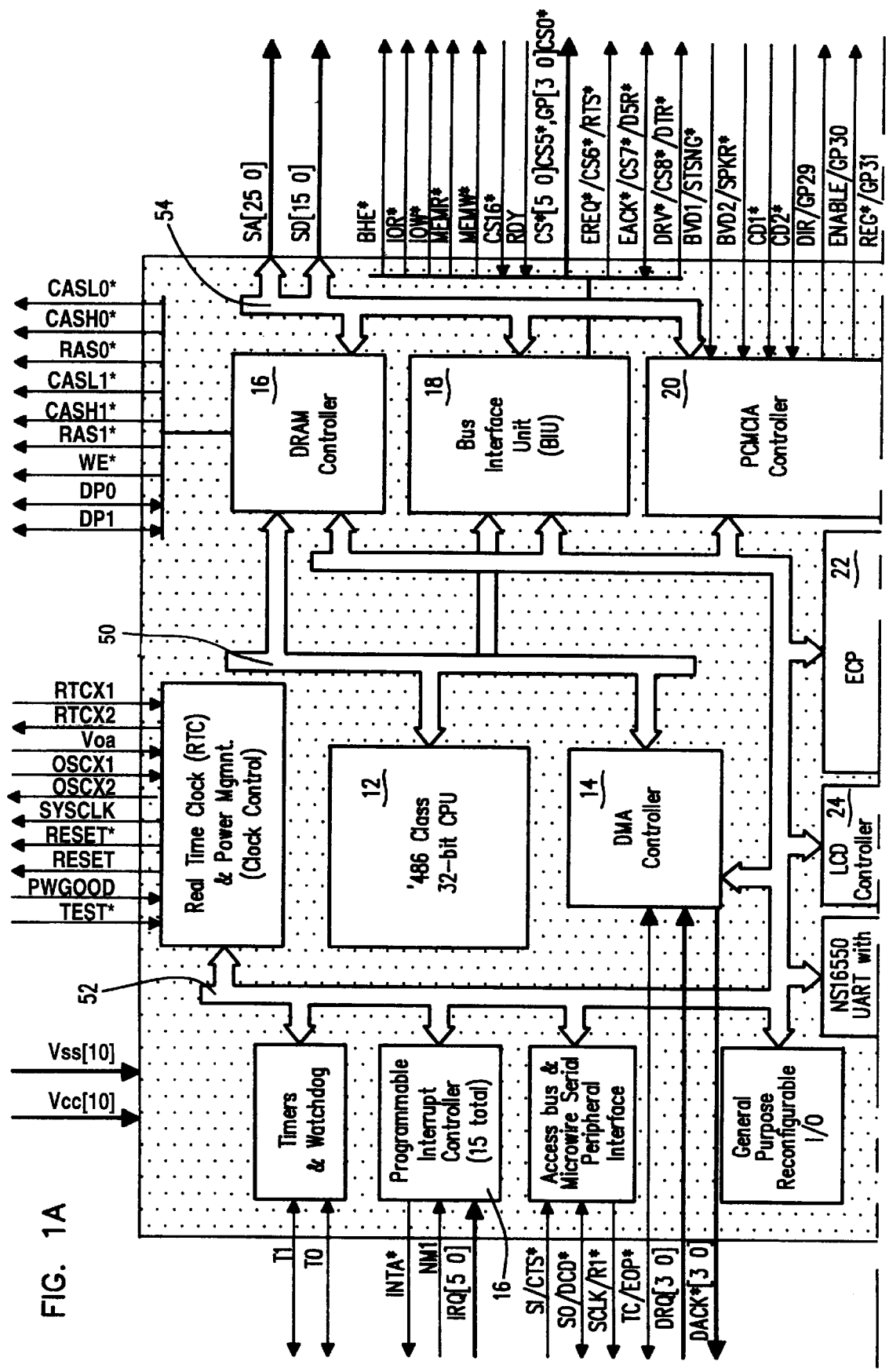
FIG. 1 is a functional block diagram an integrated circuit implementing a circuit architecture in accordance with the present invention.
Figure 1B:
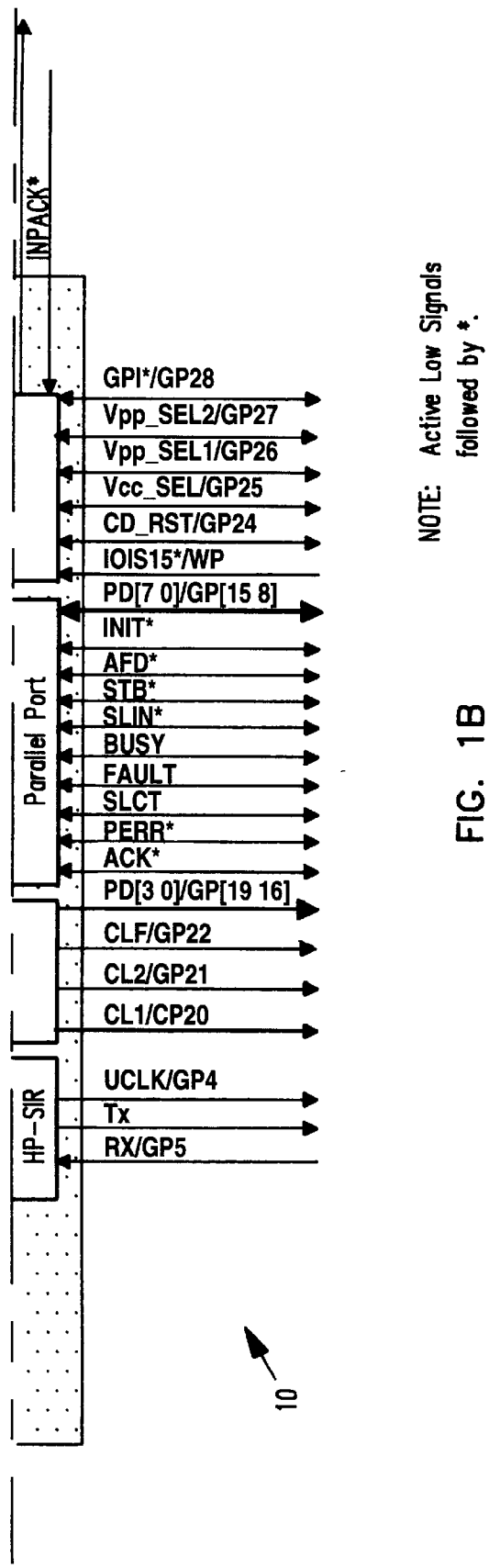
Figure 1B:
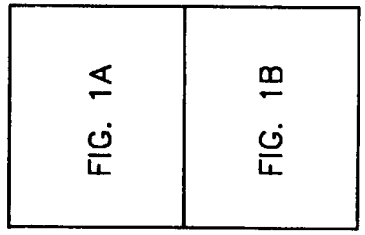

Referring to FIG. 1, an IC 10 in which the present invention has been implemented contains a number of functions integrated therein, including a central processing unit (CPU) 12, a direct memory access (DMA) controller 14, a dynamic random access memory (DRAM) controller 16, a bus interface unit (BIU) 18, a PCMCIA controller 20, an ECP parallel port 22 and a liquid crystal display (LCD) controller 24, plus a number of other peripheral circuits as shown. As discussed in more detail below, such functional elements 12, 14, 16, 18, 20, 22, 24 communicate via one or more signal buses 50, 52, 54 amongst themselves and with external functional elements (not shown) which are connected to the external terminals of the IC 10. (Further discussion beyond that which follows immediately below can be found in the various documents which are referenced and incorporated herein by reference at the end of this section.)

Figure 2A:
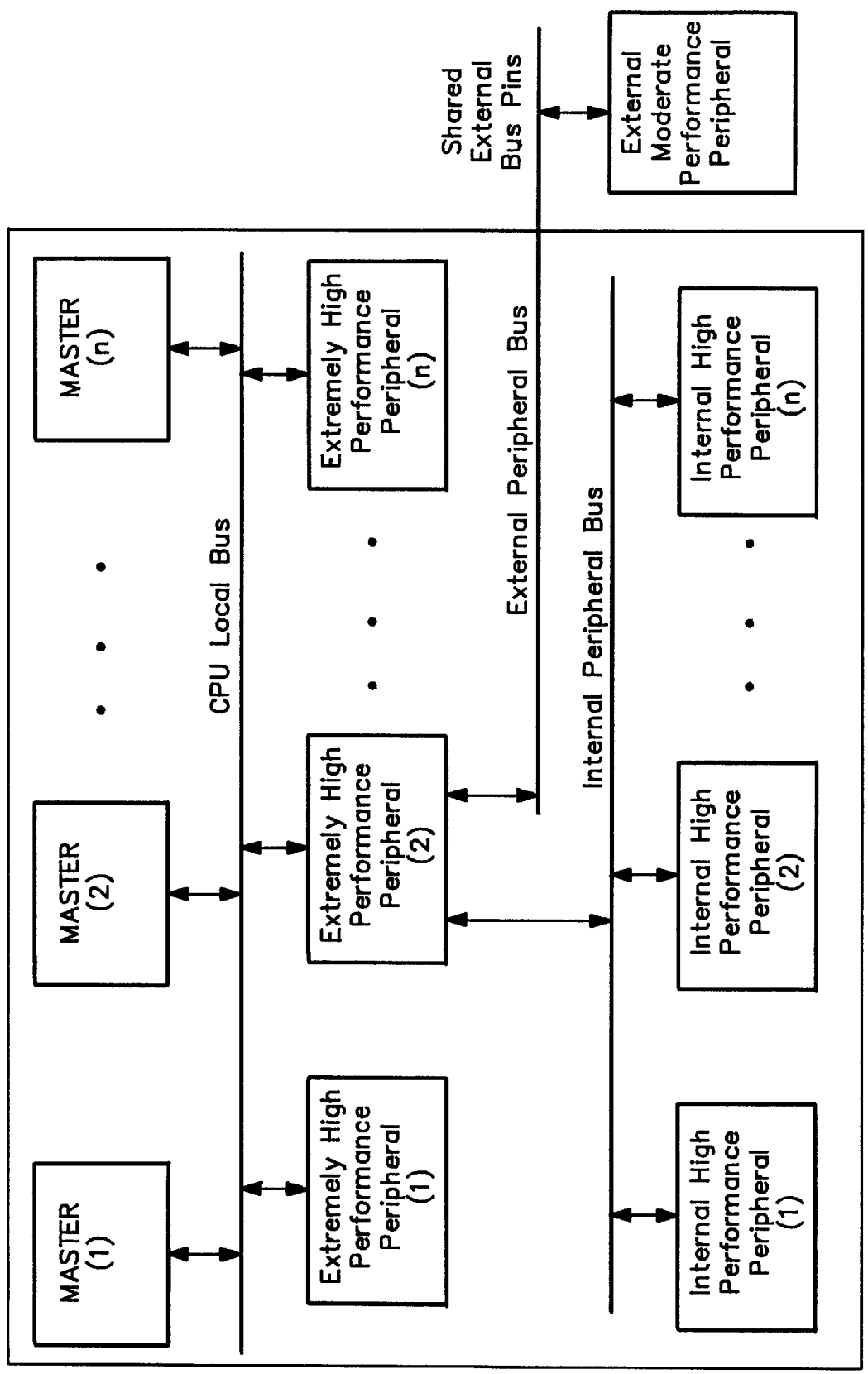
FIG. 2A is a functional block diagram of the architecture of an integrated circuit in accordance with one embodiment of the present invention.

Referring to FIG. 2A, a circuit architecture in accordance with one embodiment of the present invention can be summarized as follows. The architecture is based around a three-bus structure. The masters all drive the highest performance bus (CPU local bus). Only the peripherals which are accessed and used most often are connected to this bus. This allows the use of such peripherals to be optimized and the performance of the system maximized. By using this three-bus structure, the overall performance of the IC in the system can be optimized, while allowing the system designer the flexibility of adding additional external peripherals for greater system functionality.

A second internal high performance peripheral bus is also provided to support the next most commonly accessed and used peripherals on the IC. These peripherals on the internal peripheral bus are accessed at slightly slower speeds than the peripherals on the CPU local bus. Since these internal peripheral bus peripherals are accessed less often than those on the CPU local bus the overall performance of the system remains high by segregating the highest performance peripherals onto the extremely high performance CPU local bus and all other internal peripherals onto the high performance, internal peripheral bus.

The third bus in the architecture is the medium performance, external peripheral bus. This bus supports external peripheral(s) added by the system designer. This bus allows a system designer the flexibility to add external peripherals, albeit with accesses to such peripherals being at more moderate speeds.

As discussed in more detail below, the architecture includes three physical buses that correspond to five logical buses. The architecture also distributes the arbitration and cycle control logic into five separate blocks within the design. The arbitration and cycle control logic in each of the separate blocks perform unique tasks which, when operating together, efficiently determine the master performing the bus access, the type of access which is being requested and the physical (and logical) bus upon which the cycle is to run.

Figure 2B:
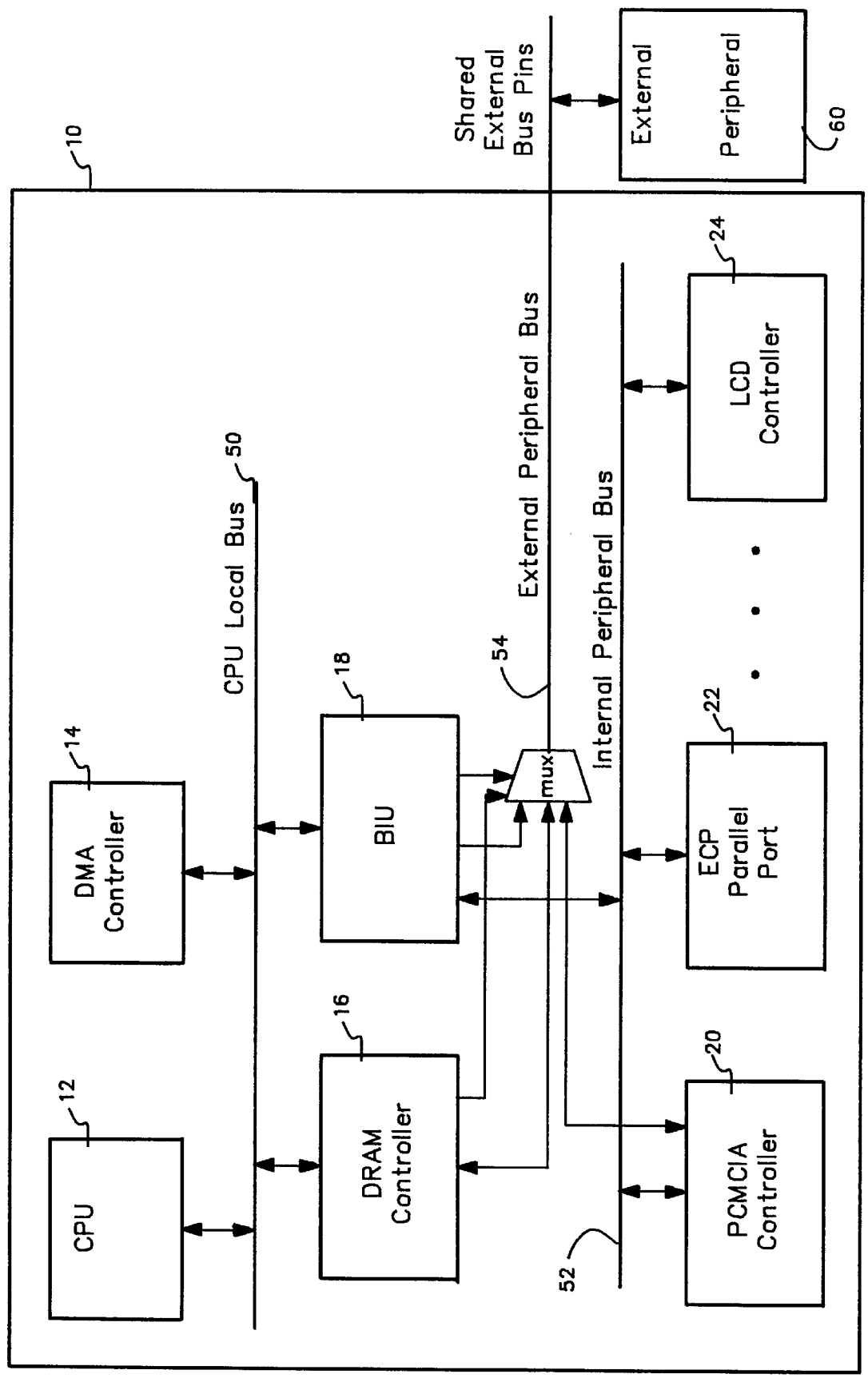
FIG. 2B is a more detailed functional block diagram of the architecture of FIG. 2A as implemented in the integrated circuit of FIG. 1.

Referring to FIG. 2B, for the above-discussed circuit architecture as implemented in the IC 10 of FIG. 1, the first physical (and logical) bus is the multimaster, synchronous, extremely high performance CPU local bus 50. From an architectural point of view the CPU local bus 50 may be driven by any number of bus masters (making this bus a multi-master bus). Before driving the CPU local bus 50 a bus master must first arbitrate for, and gain control of, the CPU local bus 50. In the IC 10 of FIG. 1, there are two bus masters, namely the CPU 12 and the DMA controller 14. The CPU 12 is the default bus master and retains control of the CPU local bus 50 at all times except when the DMA controller 14 requests control, whereupon the CPU 12 grants control of the CPU local bus 50 to the DMA controller 14 at its first reasonable chance, e.g. upon completion of the execution of the present CPU bus transaction sequence. After gaining control of the CPU local bus 50, the DMA controller 14 retains control until such time as it removes its request for continued mastership, whereupon the CPU 12 resumes its control of the CPU local bus 50.

The CPU 12 may be viewed as the "primary master" of the CPU local bus 50 and the DMA controller 14 as an "alternate master." The architecture supports one "primary master" and an unlimited number of "alternate masters."

The CPU local bus 50 is synchronous, which means that all signals on the bus are considered to be valid only in reference to the bus's clock signal. In the IC 10 of FIG. 1, all signals are valid only in reference to the rising edge of the clock for the CPU local bus 50. Further, the CPU local bus 50 is considered to operate at an extremely high performance because the bus is capable of performing one access per clock period, which corresponds to the theoretical maximum performance of a synchronous bus.

In order to maximize the operating frequency of the CPU local bus 50 only a small number of the highest performing, synchronous peripherals are connected to it. These two peripherals are the DRAM controller 16 and the BIU 18. The DRAM controller 16 performs all accesses to the heavily utilized DRAM system memory (not shown) while the BIU 18 provides an internal, asynchronous, high performance peripheral bus 52 and an external, asynchronous, moderate performance peripheral bus 54.

Both the DRAM controller 16 and the BIU 18 receive a CPU local bus 50 access at the same time and both blocks 16, 18 begin determining the type of cycle and its target. Architecturally, either the DRAM controller 16 or the BIU 18, or both, must make the ultimate determination of which one of the two blocks 16, 18 will perform the access. In the IC 10 of FIG. 1, the DRAM controller 16 either accepts or rejects the cycle. The BIU 18 accepts all cycles rejected by the DRAM controller 16 and rejects all cycles accepted by the DRAM controller 16.

When the DRAM controller 16 performs the access requested on the CPU local bus 50, it does so by accessing external DRAM (not shown) coupled to the IC 10 via the shared external bus 54 pins. These shared external bus 54 pins form the second physical bus but, as the name suggests, these pins are shared by multiple logical buses. When the DRAM controller 16 controls these shared external bus 54 pins, the logical bus at that point in time is the external DRAM interface bus.

As noted above, the BIU 18 accepts all CPU local bus 50 accesses rejected by the DRAM controller 16. If the PCMCIA controller 20 is enabled, the BIU 18 sends the access to the PCMCIA controller 20 before attempting to perform any other access. If the PCMCIA controller 20 accepts the access, then the PCMCIA controller 20 will complete the access by generating the appropriate signals on the shared external bus 54 pins. This is the second logical bus (PCMCIA Card interface bus) to be multiplexed onto the single physical set of shared external bus 54 pins.

If the PCMCIA controller 20 rejects the access or if the PCMCIA controller 20 is not enabled, the BIU 18 then determines if the access is to an internal peripheral or an external peripheral. The BIU 18 makes this determination based upon which internal peripherals have been programmed to be enabled, the address(es) at which such enabled, internal peripherals reside at and the address of the present access.

If the BIU 18 determines the access is to an internal peripheral, the BIU 18 generates an asynchronous, internal peripheral bus 52 access to complete the access. The asynchronous, high-performance, internal peripheral bus 52 constitutes the third physical bus of the architecture and the fourth logical bus of the architecture.

On the other hand, if the BIU 18 determines that an access is to the external peripheral bus 54, the BIU 18 accomplishes this access by generating the appropriate signals on the shared external bus 54 pins. This is the fifth logical bus associated with the architecture. Accesses which are not to any of the on-chip peripherals always result in an external peripheral bus access on the shared external bus 54 pins.

Lastly, to perform more efficient data transfers, the DMA controller 14 performs system memory accesses via the CPU local bus 50 (as described above), while also overlapping the beginning and the end of those accesses with accesses with the DMA-requesting devices via a direct connection with and in cooperation with the BIU 18. The DMA-requesting devices can be on either the internal peripheral bus 52 (such as the ECP controller 22 or LCD controller 24) or on the external peripheral bus 54.

Figure 3A:
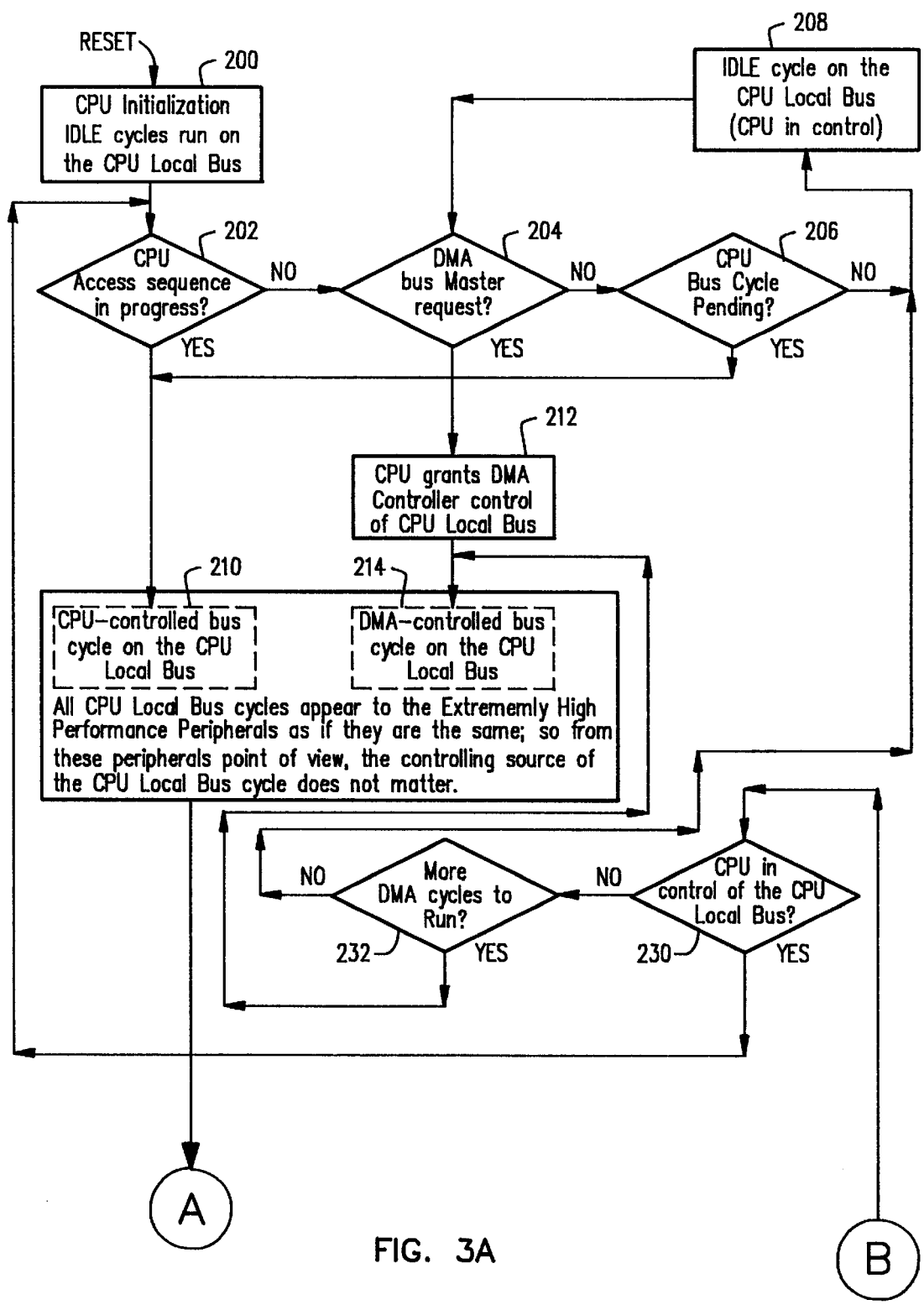
FIGS. 3A and 3B together illustrate a flowchart of distributed arbitration among the central processing unit, DMA controller, DRAM controller, bus interface unit and PCMCIA controller of FIG. 1 for controlling transactions on the buses in accordance with another embodiment of the present invention.
Figure 3B:
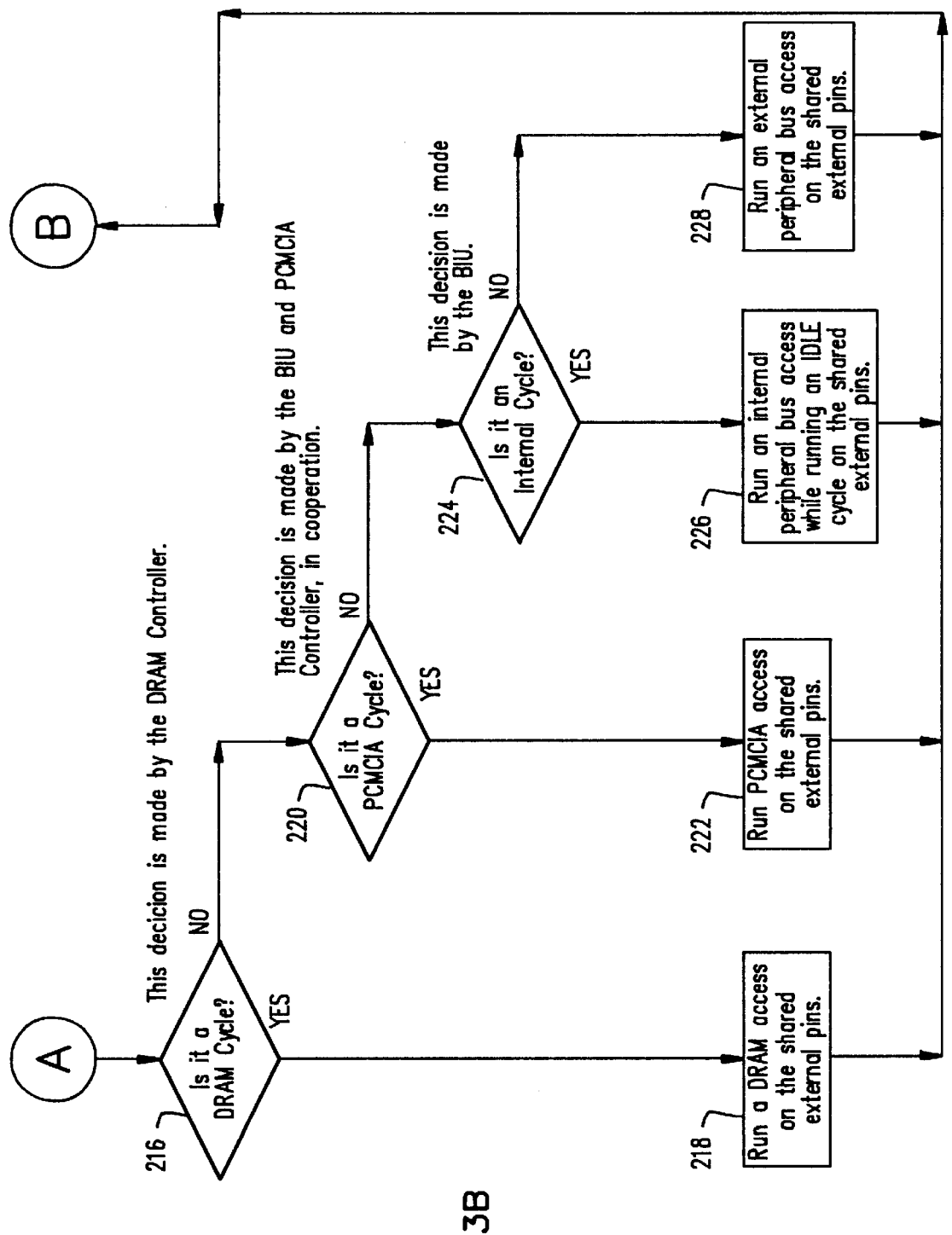

Referring to FIGS. 3A and 3B together, the distributed arbitration among the CPU 12, DMA controller 14, DRAM controller 16, BIU 18 and PCMCIA controller 20 can be better understood. During the initial system state 200, e.g. following system power-up or reset, the CPU 12 is initialized and idle cycles are run on the CPU local bus 50. The next operation 202 is a decision as to whether a CPU access sequence is in progress. If not, the next operation 204 is a determination as to whether the DMA controller 14 has requested to be a bus master. If not, the next operation 206 is a decision as to whether a CPU bus cycle is pending. If not, the next operation 208 is to process another idle cycle on the CPU local bus 50, with the CPU 12 in control. This idle cycle operation 208 is repeated for as long as no request is received from the DMA controller 14 for bus 50 control and no CPU bus cycle is pending.

If a CPU access sequence was in progress, the system enters a state 210 in which the CPU 12 is in control of the CPU local bus 50. Similarly, if a DMA bus master request from the DMA controller 14 had been received by the CPU 12, an operation 212 is performed in which the CPU 12 grants control of the CPU local bus 50 to the DMA controller 14 and the system enters a state 214 in which the DMA controller 14 is now in control of the CPU local bus 50.

The next operation 216 is a decision made by the DRAM controller 16 as to whether the cycle is a DRAM cycle. If so, the next operation 218 is to run a DRAM access sequence on the shared external bus 54 pins. If not, the next operation 220 is a decision made in cooperation by the BIU 18 and PCMCIA controller 20 as to whether the cycle is a PCMCIA cycle. If so, the next operation 222 is to run a PCMCIA access sequence on the shared external bus 54 pins. If not, the next operation 224 is a decision by the BIU 18 as to whether the cycle is an internal cycle. If so, the next operation 226 is to run an internal peripheral bus access sequence while running an idle cycle on the shared external bus 54 pins. If not, the next operation 228 is to run an external peripheral bus 54 access on the shared external bus 54 pins.

Following each of these access operations 218, 222, 226, 228 the next operation 230 is a decision as to whether the CPU 12 is in control of the CPU local bus 50. If so, the foregoing process is repeated beginning with the operation 202 determining whether a CPU access sequence is progress. If not, the next operation 232 is to determine whether there are more DMA cycles to be run. If so, the system continues, or renters, the state 214 in which the CPU local bus 50 is controlled by the DMA controller 14. If not, the next operation 208 is to run an idle cycle on the CPU local bus 50 with the CPU 12 in control.

Hence, the basic architecture of the IC 10 demonstrates a multi-master, distributed arbitration and distributed access control design for the purpose of maximizing performance from the peripherals accessed most often, while still providing high performance from the less frequently accessed on-chip peripherals and maintaining moderate performance for access to off-chip peripherals.

As discussed in more detail below, the CPU 12 is a 32-bit processor with an instruction set compatible with the standard Intel486 processor. Its performance is determined mainly by clock speed, the number of clock cycles per instruction and the number of instructions executed. The target clock frequency was, to a large extent, predetermined by manufacturing constraints, typical application requirements and implementation strategy, plus the number of instructions executed was constrained by the use of the x86 instruction set architecture (ISA). Hence, the focus for increasing performance was the number of clock cycles needed, on average, for each instruction, i.e. clocks per instruction (CPI).

Accordingly, the CPU architecture was designed to execute instructions in the least number of clock cycles. A three-stage pipeline is used which reduces the number of bypasses, interlocks and die size. This also reduces the branch penalty when a conditional branch is taken. The clocks per instruction for all the instructions sought to be optimized were then estimated based upon this architecture and additional logic was designed into the architecture to obtain those numbers.

Figure 4A:
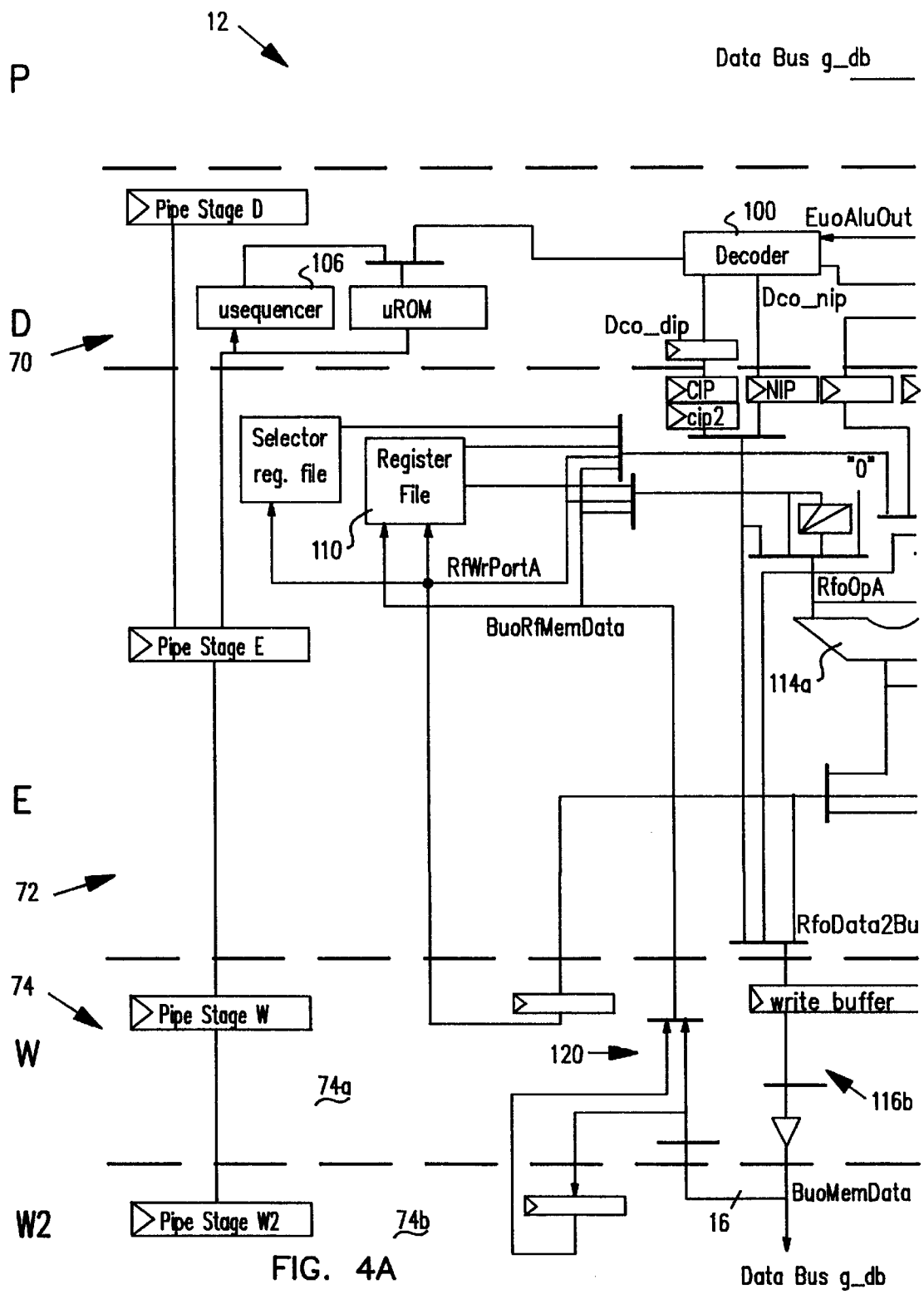
FIG. 4 is a functional block diagram of the architecture implementation for the central processing unit of the integrated circuit of FIG. 1.
Figure 4B:
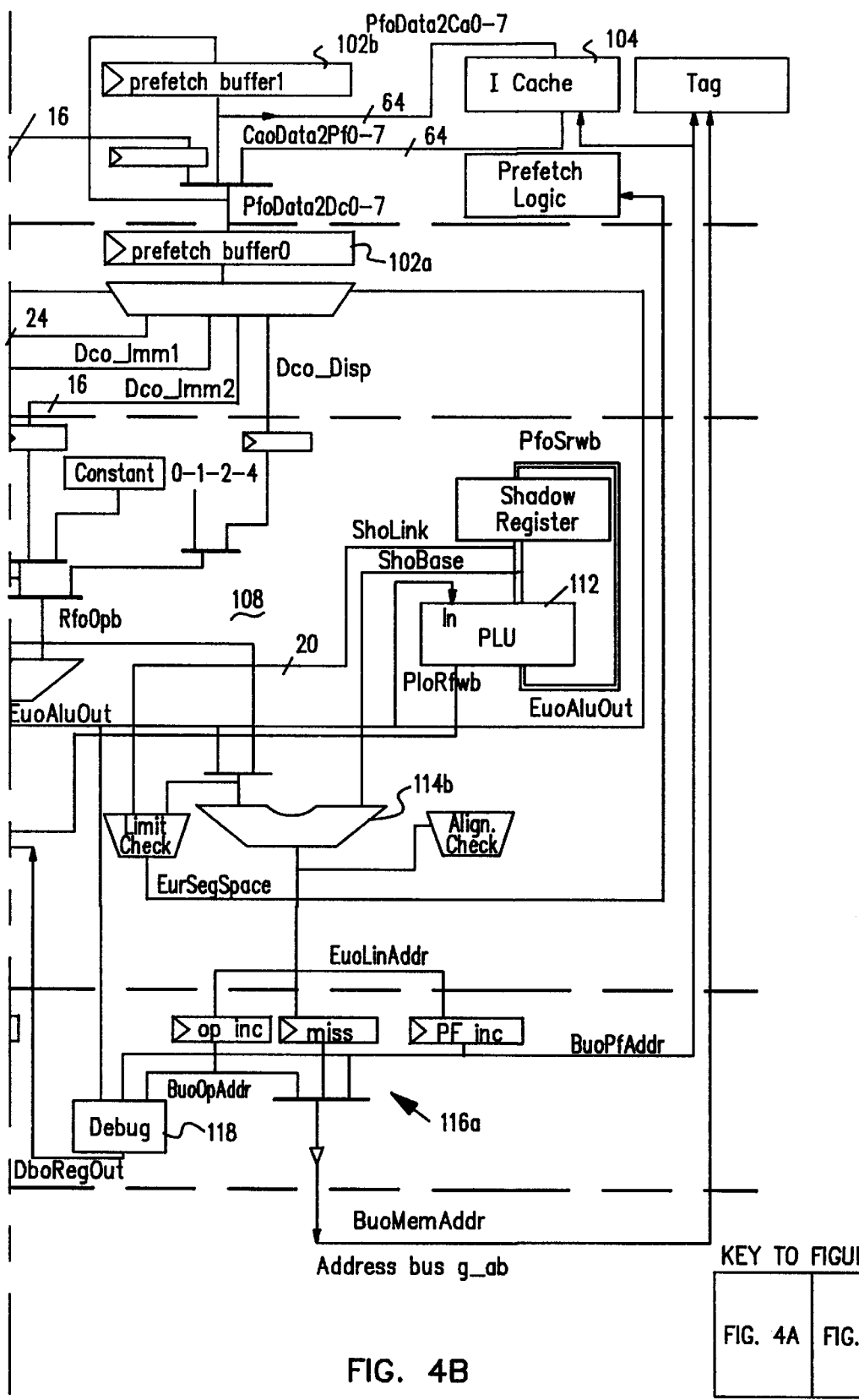

Referring to FIG. 4, the architecture of the CPU 12 employs a three-stage pipeline using microprogrammed control. The three primary stages of the pipe are the decode 70, execute 72 and writeback 74 stages. The writeback stage 74 is further divided into two substages 74a, 74b. The second substage 74b is only used for some of the memory accesses. For register-to-register operations, only three stages are required. Hence the pipeline functions primarily with these three stages 70, 72, 74.

The decode stage 70 nominally contains the decode unit 100 but functions as more than just the instruction decoder. This stage 70 also includes the prefetch buffer 102, instruction cache 104 and microsequencer 106. The prefetch buffer 102 is 16 bytes wide and is designed as a two tier unit 102a, 102b. The prefetch unit 102 tries to keep the instruction decoder 100 fully supplied with all the bytes of the instruction it is currently decoding, which can be up to 15 bytes long. The prefetch unit 102 interfaces with the instruction cache 104. The prefetch unit 102 tries to fetch ahead of the decoder 100. This look-ahead mechanism significantly improves performance.

The instruction cache 104 contains 1K bytes organized as direct mapped with a line size of eight bytes. The instruction cache 104 snoops on the bus to avoid stale data due to self-modifying code. (This is another example of the performance driven approach to the design of the CPU 12.) Since most of the target application code is small, a 1K cache gives a significant performance improvement, and implementing a larger cache was not essential. This reduces the area and hence the cost of the chip 10. Also, as many of the target applications execute from read only memory (ROM), a significant performance increase is obtained.

The decoder 100 is capable of decoding the simple instructions in a single cycle. Prefixes and complex instructions take more than one cycle to decode. The microsequencer 106 then takes over and steps through the microcode for the instructions. Most of the microcode is single cycle except for the complex instructions, including the ones to support the protection mechanism of the i486. Both the decoder 100 and the microsequencer 106 employ logic designs that save power and area.

The execute stage 72 not only fetches operands and executes the instructions, but also computes the memory addresses. The x86 architecture has a segmented address space with many complex addressing modes to access this addressing space. The segmented memory space means that to obtain the physical address that actually goes on the bus at least one addition must be performed, that of the segment base and the offset within such segment. This is further complicated by the computation of the segment offset which can have up to three more parts: base; index; and displacement. Since computing the entire address composed of all these parts in a single cycle would be expensive, the predominant cases were optimized, i.e. those having only a scaled index and a displacement, or a base and a displacement. The execution unit 108 is capable of performing the entire address computation in a single cycle, i.e. it can perform two address additions in the same cycle. Also segment limit checking is done at this point to prevent segment overruns. The linear address thus computed (this is also the physical address) is sent to a bus unit (discussed in more detail below) for dispatch to the external world. This design allows the single-cycle execution of frequently used load, store, push and pop instructions.

The execute stage 72 also involves the architectural register file 110 and the protection logic mechanisms 112. The register file 110 resolves the source and destination information for all the operations in the execute stage 72. It also allows bypassing of results either from the output of the arithmetic and logic unit (ALU) 114 or from a load operation from memory. This helps reduce pipeline bubbles due to data dependencies. The full i486 protection mechanism was implemented except for the Virtual86 mode support, and most of the i486 exceptions were implemented except for those deemed to be of no relevance to the target applications.

The writeback stage 74 includes a bus unit 116, debug logic 118 and register writeback logic 120. In this stage 74 memory access is initiated and completed, and the register file 110 is updated. The second writeback substage 74b allows an independent register operation to be completed, out of order, while a memory write access is still pending. The memory access is pipelined which allows a new read/write operation to be initiated every cycle. (With an initial implementation at 25 Mhz this gives single-cycle memory access; therefore, a data cache does not significantly improve performance.)

Figure 5:
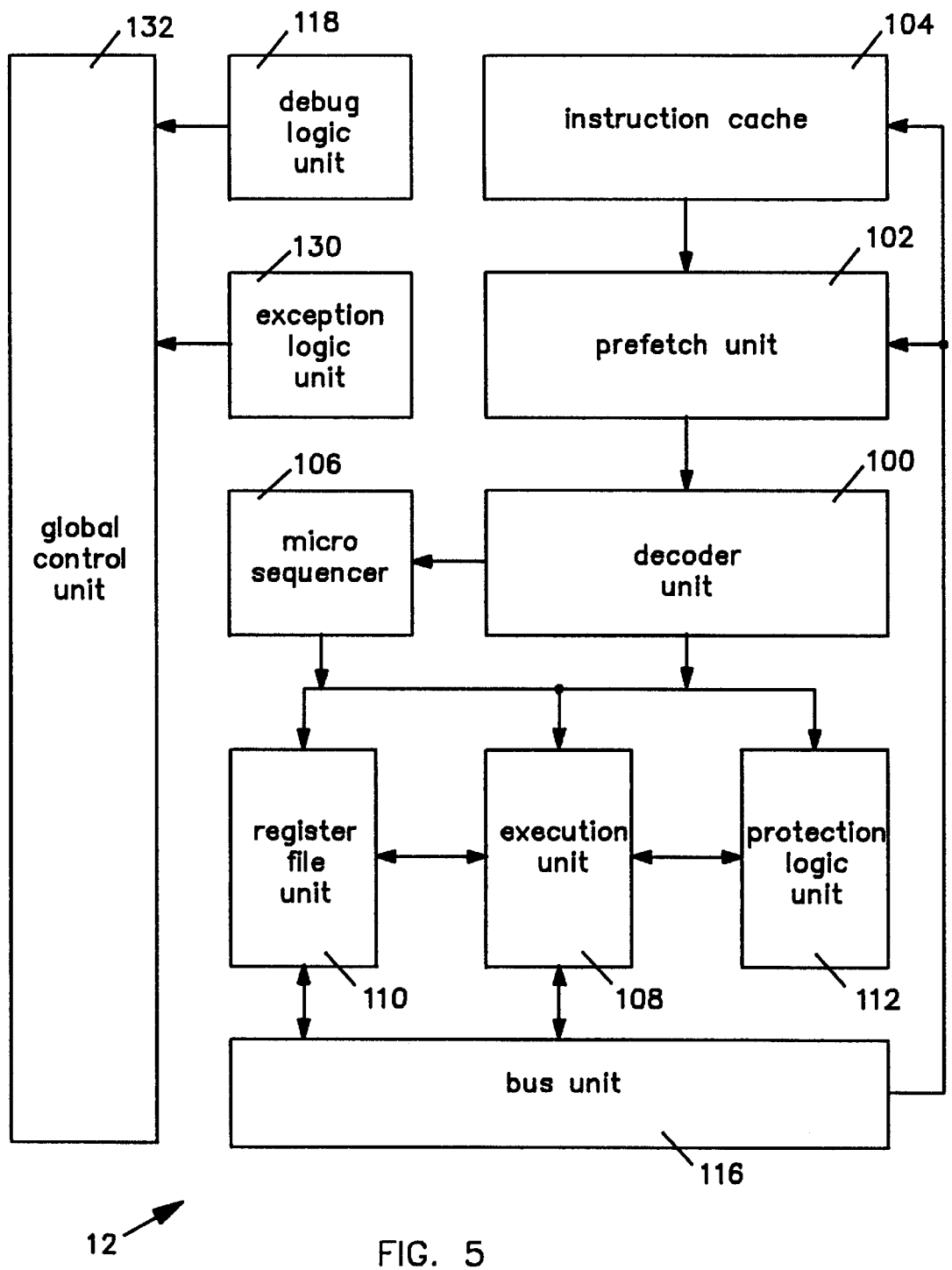
FIG. 5 is a functional block diagram of the logic implementation for the central processing unit of the integrated circuit of FIG. 1.

Referring to FIG. 5, the CPU 12 is divided into 11 blocks to reduce the complexity of the design: prefetch unit 102; decoder unit 100; microsequencer 106; register file unit 110; execution unit 108; protection logic unit 112; exception logic unit 130; debug logic unit 118; bus unit 116; global control unit 132; and instruction cache 104.

The prefetch unit 102 consists of two 8-byte registers 102a, 102b (FIG. 4) that are filled in either from the instruction cache 104 or directly from memory. The decode unit 100 gets the instruction from the prefetch unit 102 and consumes them to generate the entry microcode address for the instruction, register addresses, immediate values, displacement values and segment information. The decoder 100 also generates information for some of the exceptions, and is also used to handle the case of the non-implemented instructions, i.e. x86 instructions that are not implemented on the CPU 12.

The microsequencer 106 controls the stepping through of the instruction microcode. It generates the next microcode address and looks up the microcode ROM. The micro-ROM address can come from different places: the decoder 100 if a new instruction is started; the microcode if the present instruction is not finished; or the exception logic 130 in the case of exceptions.

The register file unit 110 reads the operands, resolves the bypasses, generates constants and aligns operands. The architecture registers and the selectors (i.e. the segment lookup registers) are implemented in this block. The architectural register file has dual read and write ports. Since registers can be accessed either as a single byte, a word (two bytes) or a double word (four bytes), the dual read and write ports in this register file 110 are complex. The dual write ports optimize load instructions and simultaneous completion of instructions.

The execution unit 108 has two major functions. One is to perform all the arithmetic and logic operations. For this function, the execution unit 108 has an arithmetic and logic unit 114 (FIG. 4) and a barrel shifter. The second function is address computation (linear address generation) and limit checking. This unit 108 computes the address offset and linear address and does the limit checking in a single cycle.

The bus unit 116 is the interface for the CPU 12 to the CPU local bus 50. It implements a 32-bit address bus and, due to package pinout limitations, a 16-bit data bus. (This is not a serious bottleneck since the targeted operating systems and applications are 16-bit.) An important feature of this unit 116 is the ability to support pipelined memory access where a memory access is initiated before the previous one has finished. In this mode external DRAM is divided into pages, typically 4K bytes long. As long as the access is within one page in DRAM, single-cycle reads and writes to memory can be sustained. If a page miss occurs, three cycles are taken to complete that access. Accesses to static random access memory (SRAM) and ROM are also supported with wait states and non-pipelined memory accesses.

The global control unit 132 is the supervisor of the entire architecture. This unit 132 controls the stepping of the instruction pipeline. Interlocks, control of the exception handling, and processor shutdown are also handled by this unit 132. The exception logic 130 prioritizes and resolves all the exceptions and external interrupts. This includes the software interrupts, arithmetic exceptions, protected mode exceptions and all other faults and traps. The protection logic unit 112 is responsible for the protection mechanism defined in the Intel 486 implementation. Implementation of the four levels of protection and support for all the exceptions generated by this mechanism 112 are provided. This unit 112 is required for the implementation of the segmented memory architecture of the i486.

The debug logic 118 includes all the debug registers and implements the instruction and data breakpoints. The debug logic 118, along with the bus unit 116, also implements the requirements for external in-circuit emulation (ICE) support.

The above-described integrated circuit may also be provided with a processor core that includes features that support In-Circuit Emulation (ICE). In the discussion that follows regarding the optional ICE features of the processor, the following terminology will be used:

Clock: The clock referenced throughout this description is logically equivalent to the system clock output signal, SYSCLK, which is in turn assumed to be functionally equivalent to the on-chip "CPU Clock" signal. On-chip implementation may use a different signal for reasons of propagation delay.

ICE Mode vs. Normal Mode: This is the distinction between a device that is part of an ICE system and one that is part of an application system. A device in ICE Mode provides more input/output signal pins.

ICE Exception Mode vs. Normal Exception Mode: If a device is in ICE Mode, the Debug Register set may be placed in ICE Exception Mode, by setting an IM bit. This enables use of the Debug Registers and the ICEBP instruction to trap to the ICE system monitor.

Break Mode vs. Run Mode: This is the distinction between running an ICE monitor program and running code belonging to the application. Break Mode is entered by the ICE Exception only, and not by Interrupt 1 (the Debug Trap).

ICE Map vs. User Map: These maps are identical. The ICE monitor runs in the same addressing space as the user's code, but in an area (80000000–83FFFFFF) that is reserved for ICE use only.

Overlay vs. Target Memory: Memory visible by user code may be physically present either in the target circuit memory or may be emulated within the ICE system (Overlay). Due to the fact that the DRAM controller is always active, Overlay Memory will have to emulate a Page Mode DRAM if it is mapped into the DRAM's addressing space.

An in-circuit emulator processor in accordance with the present invention is preferably packaged monolithically and provides ICE-dedicated signal pins that are not provided in the above-described processor which the ICE is to emulate. However, the chip die of the emulator processor is preferably identical to the target processor.

Table 1 describes the signals provided during "emulator mode" of the in-circuit emulator processor. As described in Table 1, emulator mode is selected by asserting a signal at the ICEMODE input signal pin at system reset. Unless a signal is asserted at the ICEMODE input signal pin at system reset, signals provided at the dedicated ICE output signal pins are indeterminate, and all ICE features on-chip are disabled. The selected mode remains in effect until the next time the device is reset.

TABLE 1

EMULATOR DEDICATED SIGNAL PINS

| Signal (type) | Description | Type |
| --- | --- | --- |
| ICEMODE (input) | If high at the end of Reset, this pin selects ICE Mode operation of the device. While running in ICE Mode, this input dynamically selects the performance level: 1 = Aggressive Tracing: an address is guaranteed to be presented for all branch targets, at a small cost in performance because the processor must wait on in-cache branches when the bus is occupied. 0 = Non-Aggressive (Real-Time) Tracing: The processor runs in real time, without interference, and | Input, sampled at rising edge of PWGOOD signal for enabling ICE Mode, then relative to rising edges of the Clock. |

TABLE 1-continued

EMULATOR DEDICATED SIGNAL PINS

| Signal (type) | Description | Type |
|---|---|---|
| | NSF does not wait for the bus (if the target is in the cache). A valid address is therefore not always present with NSF. In the standard (non-ICE) package, this pad will be tied permanently low. Because the processor core does not have direct access to the PWGOOD pin, the latched and dynamic values of ICEMODE will be presented separately to the core. | |
| IXSTAT (output) | Instruction Execution Status. This signal is presented at the rising edge of each clock, encoding the actions being taken by the CPU: 1 = Execution Complete. An instruction, or an Exception microcode sequence, has completed execution. The NSF status may occur before or simultaneously with IXSTAT=1, and means that the exiting instruction is branching. (Exception microcode sequences always branch.) Otherwise, the instruction is continuing to the next sequential instruction in memory, and the number of bytes in the exiting instruction is signalled by the IXQUAL pins. 0 = Other. Internal status is signalled on the IXQUAL pins. | Output, status indication. Re-evaluated every rising edge of clock (i.e.: may glitch at that time, even if value does not change). |
| IXQUAL[3:0] (output) | Instruction Execution Qualifier. These four bits are presented at the rising edge of each clock, and their meaning differs according to the state of the IXSTAT signal: If IXSTAT = 1 in the same clock cycle, these signals present the length in bytes of the instruction. A value of 0000 does, not currently appear: instructions with a REPX prefix. report IXSTAT = 1 only at the end of the last iteration. Note that instruction length beyond 15 bytes is considered illegal and will cause an Invalid Opcode exception. If IXSTAT = 0, these signals present ICE exception handling status, as listed below:<br>Code   Interpretation<br>0000   No Status To Report (Default)<br>0001   ICE Exception Is Being Taken | Output, status indication. Re-evaluated every rising. edge of clock (i.e., may glitch at that time, even if value does not change). |
| NSF (output) | Non-Sequential Fetch. When presented high for one clock cycle, it indicates that the processor is performing a branch, interrupt, or anything else that changes the instruction flow in a non-sequential manner. In Aggressive Trace mode, the address of the target is guaranteed to be presented at the next or concurrent ALS pulse (but if the fetch is from the cache no data transfer strobe occurs). DMA requests will never be granted between an NSF = 1 cycle and its associated ALS pulse. | Output, status indication. Re-evaluated every rising edge of clock (i.e.: may glitch at that time, even if value does not change). |
| ODD (output) | A "1" on this pin indicates that the address being accessed is odd. This pin replaces pin SA0 for tracing purposes, since SA0 is always held at zero during instruction fetches if the cache is enabled. | Output, status indication. Re-evaluated every rising 1 edge of clock (i.e.: may glitch at that time, even if value does not change). Use ALS to latch it. |
| OCP (output) | High means that an on-chip peripheral is being accessed. The ICD bit in BIU Control Register 1 (outside the CPU Core) will enable driving of on-chip peripheral data onto the off-chip bus during on-chip I/O Read cycles. This signal is provided in order to allow buffers to be disabled and avoid bus conflicts when the ICD feature is used | Output, decoded from address. |
| ICEMAP (output) | This signal goes active whenever an address within the ICE range (80000000--83FFFFFF) is presented. Its functional timing will be identical to that of the Chip Select signals. Do not delete this: without the top 6 address bits, there is no other way to tell | Output, decoded from address. |
| ALS (output) | Address Latch Strobe. Indicates the presence of a valid address on the off-chip address pins. | Output pulse. |
| BPREQ (input) | A high level requests an ICE Exception. The pin should be kept high until the request is acknowledged. The acknowledgement comes from the ICE monitor software. If BPREQ is asserted high on exit from Reset, ICE code is entered instead of Reset code. This pin always triggers the ICE Exception, regardless of whether the Debug Registers are in ICE Mode. However, the device must have been placed in Ice | Input level, sampled on rising edges of the clock. |

TABLE 1-continued

EMULATOR DEDICATED SIGNAL PINS

| Signal (type) | Description | Type |
|---|---|---|
| | Mode with the ICEMODE pin, otherwise this input is entirely disabled. | |
| DMA[1:0] (output) | Indicates by a two-bit encoded value which, if any, of the three on-chip (otherwise invisible) DMA channels is active.<br>Code   Interpretation<br>00      None<br>01      LCD Controller<br>10      ECP Port<br>11      PCMCIA Controller | Outputs, combinationally. following the on-chip DACK signals. |
| VCC (input) | One extra VCC pin. | Power |
| GND (input) | One extra Ground pin. | Power |
| | The following three signals encode the traditional '486 three-bit status code; these are enumerated in Table 2 below. | |
| $M/\overline{O}$ | One of three bus status indicators:<br>1 = Memory access, 0 = I/O access<br>(Will be 1 during fly-by DMA xfers.) | Output, status indication. |
| $D/\overline{C}$ | One of three bus status indicators:<br>1 = Data access, 0 = Control/Code | Output, status indication. |
| W/R | One of three bus status indicators:<br>1 = Write access, 0 = Read access | Output, status indication. |

TABLE 2

ENUMERATED BUS STATUS STATES

| $M/\overline{IO}$ | $D/\overline{C}$ | $W/\overline{R}$ | Type of Bus Event |
|---|---|---|---|
| 0 | 0 | 0 | Interrupt Acknowledge |
| 0 | 0 | 1 | Halt/Special |
| 0 | 1 | 0 | I/O Read |
| 0 | 1 | 1 | I/O Write |
| 1 | 0 | 0 | Code Read |
| 1 | 0 | 1 | (Not Used) |
| 1 | 1 | 0 | Memory Read |
| 1 | 1 | 1 | Memory Write |

Two bits are added to the processor's Debug Registers to support ICE environments:

IM Bit 12 of Register DR7
BI Bit 12 of Register DR6

Setting the IM bit of the debug register causes breakpoints to trigger the ICE Exception (i.e., monitor code) rather than an interrupt that is serviced by user supplied code. Also, while IM=1, the ICEBP instruction (a software TRAP instruction) triggers the ICE Exception instead of an interrupt which is serviced by user supplied code.

The IM bit is reset to zero by a chip reset, regardless of whether ICE Mode or Normal Mode is selected for the whole device. It must be set to a "1" by software action.

The BI bit, in ICE Mode, is set by hardware whenever an externally generated breakpoint (signalled at the BPREQ pin) is one of the causes for an ICE Exception. The BI bit is cleared by software action.

Figure 6:
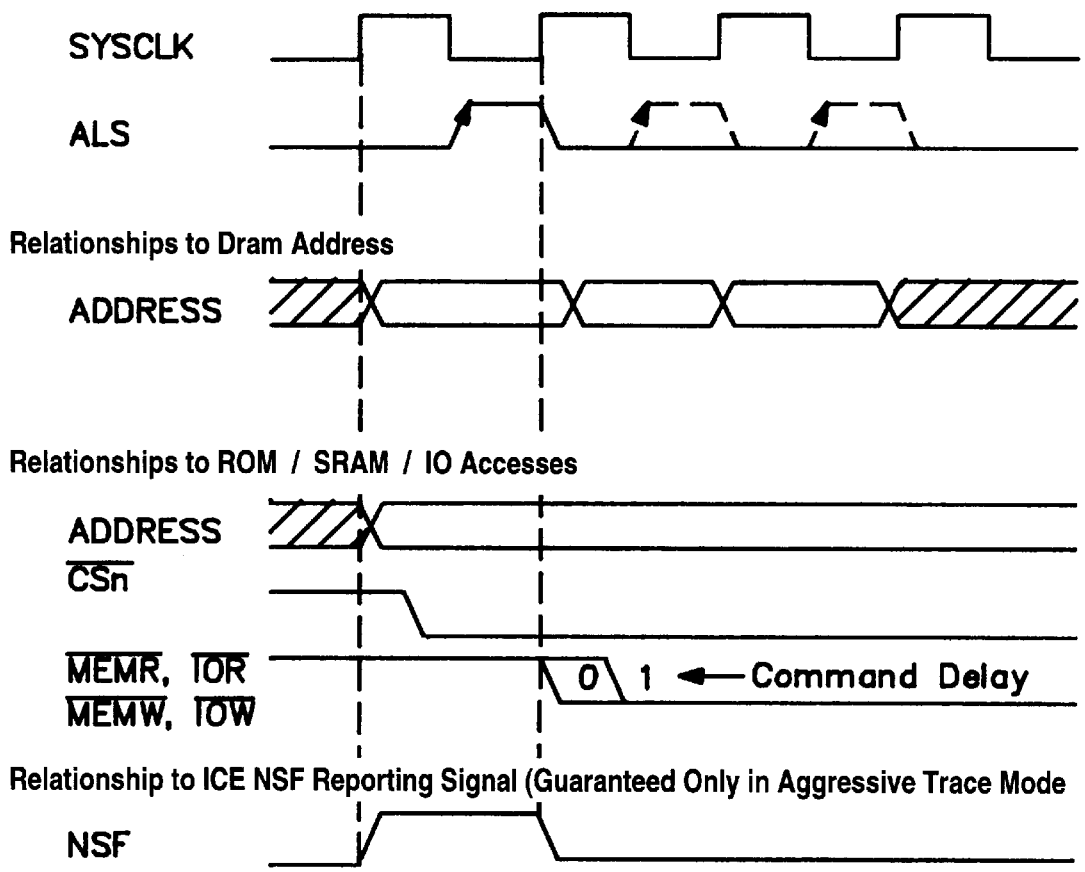
FIG. 6 is a timing diagram illustrating the ALS signal waveform.

FIG. 6 illustrates the timing of the ALS signal. As shown in FIG. 6, ALS is a high-going pulse, suitable for latching addresses on its rising edge. The trailing edge should not normally be used, since the address may be changing simultaneously with it. ALS is presented synchronously with all valid addresses on the off-chip bus.

The main purpose of the NSF, IXSTAT and IXQUAL signals is to allow off-chip hardware to follow the linear address referenced by the current EIP (Instruction Pointer) value as execution proceeds. This is done in Aggressive Tracing Mode by loading an off-chip Linear EIP ("LEIP") register from the address bus whenever a Non-Sequential Fetch indication (NSF) is given, and by adding the contents of the IXQUAL value to the LEIP register in any clock cycle where IXSTAT is high. However, in branching instructions, and in exception service microcode sequences, there is an IXSTAT indication which must be handled differently.

Figure 7:
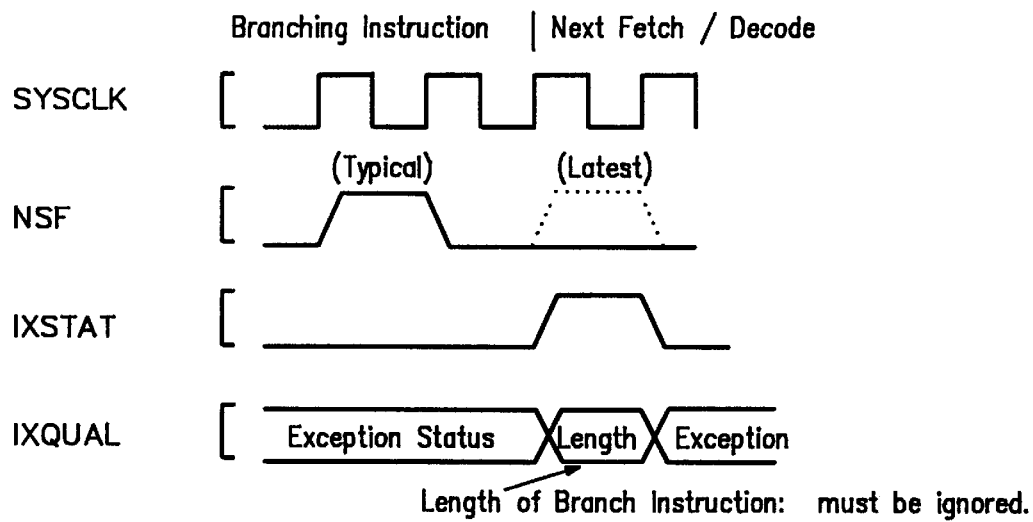
FIG. 7 is a timing diagram illustrating the relationship between the NSF indication and the IXSTAT and IXQUAL status signals when an instruction branches.

The timing diagram provided in FIG. 7 illustrates the relationship between the NSF indication and the IXSTAT and IXQUAL status signals when an instruction branches. Note that the NSF indication occurs at or before the time that the branching instruction indicates that it is exiting (IXSTAT=1). When an NSF indication is seen, the associated IXSTAT=1 indication must not be allowed to increment the LEIP. Incrementing the LEIP at that time would generate a bad value by adding the length of the branching instruction to the target address. In the case of exception service, the length value presented when IXSTAT=1 is undefined.

In spite of the fact that the IXSTAT signal should not be used to increment the LEIP value in this circumstance, it still provides valuable information. It is possible for some branching instructions to be faulted after they have signalled an NSF. In this case, the presence or absence of the IXQUAL=1 state is a reliable indication of whether the instruction has completed before the exception is taken.

The $\overline{B}$ $\overline{H}$ $\overline{E}$ pin follows all addresses, regardless of the locations addressed. This represents no change between ICE Mode and Normal Mode.

The $\overline{IO}$ $\overline{R}$ and $\overline{IO}$ $\overline{W}$ strobe signals are activated for all I/O accesses, internal as well as external.

The input signals ICEMODE and BPREQ are allowed to be presented with a zero hold time relative to the latching edge of SYSCLK.

Figure 8:
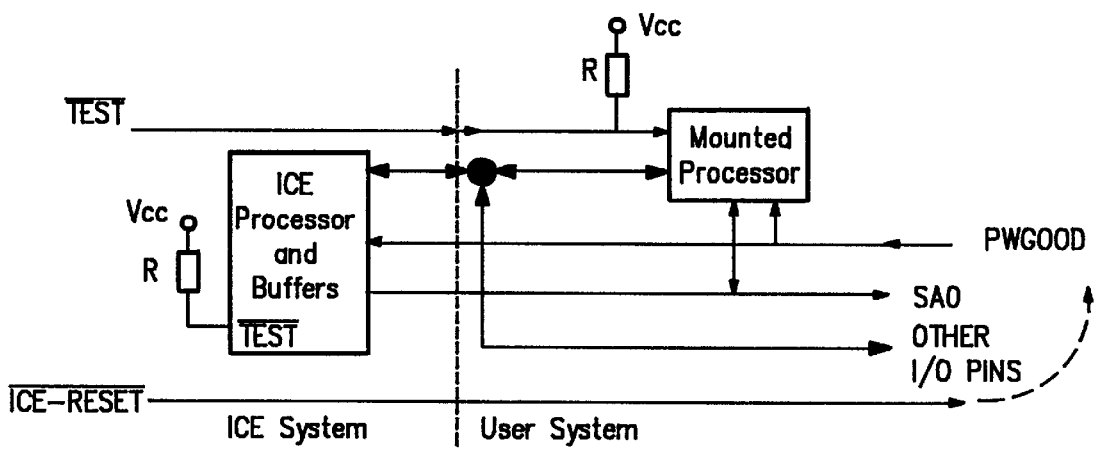
FIG. 8 is a schematic representation of installation of an emulator processor chip as a clip-on over a production target device.
Figure 9:
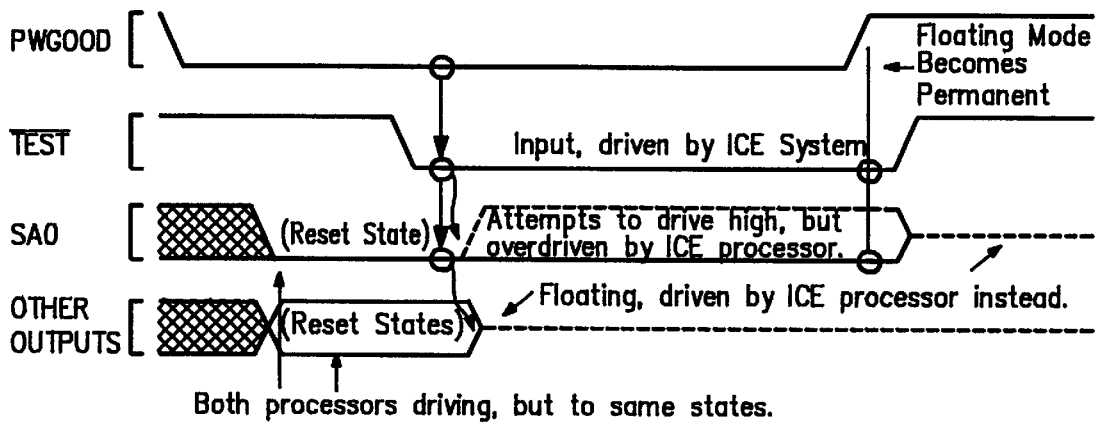
FIG. 9 is a timing diagram illustrating disabling a mounted processor with ICE present.

The emulator support processor is installed onto user hardware (e.g., a production board) by means of a clip over an existing, mounted chip, as shown schematically in FIG. 8. That chip is disabled, with all pins floating, so that the emulator support processor in the ICE can drive the system. As shown in FIG. 9, this is done by driving two pins during Reset: the signals TEST and SA0. The normal Reset state of SA0 will be low; however, if the TEST pin is pulled low while the PWGOOD signal is low (i.e., while the chip is in the Reset state), the chip will attempt to drive SA0 high with a weak device. If SA0 is held low externally (by the corresponding pin of the ICE device), all other pins will float immediately. Upon the end of Reset (PWGOOD going high), the floating condition will be made permanent, and the weak driver on SA0 will also be turned off, causing it to float as well. This state will remain in effect until the next Reset. (This scheme implies that in any other Test Mode the outputs will float briefly between the time that TEST is brought low and the time that SA0 rises.)

Also, in any system which will allow attachment of an ICE system, it is not allowed to connect the TEST pin directly to Vcc.

The documented features of the Debug Registers, as defined for the '486 architecture, are fully implemented in the emulator processor.

There is no intention to stop any free-running timers by hardware action on occurrence of the ICE Exception. The Watchdog is supported by a lockout on NMI.

The ICE Mapped space is not intended to be disjoint from the normal User Mapped space. ICE Mapped memory occupies all addresses consisting of 100000 (binary) in the most significant 6 bits of the 32-bit address (addresses 80000000–83FFFFFF hex). The user-programmable Chip Selects must never be programmed to respond to this address range, but there is no hardware on-chip to prevent this from happening. It is the responsibility of the development software never to allocate memory here. It is the responsibility of the ICE system to detect a user's attempt to access this space other than by triggering the ICE Exception.

The ICE Mapped space is also assumed to be 16 bits wide when ICE Mode is enabled. The CS16 signal will be ignored for accesses within this space. During accesses to locations in the ICE Map, the ISA-like memory timing is used. When the device is in ICE Mode, software is able to access a register at 10 Address EF5Fh, which is called the ICE Mode Timing Control Register. When the device is not in ICE Mode, this register has no effect and may not be read or written.

The following are the definitions of the bits within the Mode Timing Control Register:

I_CD Bit 3. ICE Command Delay, this bit determines if a Command delay is associated with accesses to the ICE Memory address range (80000000h–83FFFFFFh). Reset state is "1".

I_WS2-0 Bits2-0. ICE Wait State bits 2-0, these bits determine the number of wait states associated with accesses to the ICE Memory address range (80000000h–83FFFFFFh). Reset state is "111" (7 wait states).

Reserved Bits 4–7. Reserved: make no changes to these bits.

If DRAM is used for RAM in the ICE Map space, then an off-chip DRAM controller is required.

Two modes are defined for capturing the flow of program execution: Aggressive and Non-Aggressive mode.

In Aggressive mode, every time a branch is taken, the target address (on SA25–SA1 and ODD) is sent to the bus in conjunction with the NSF signal and the ALS strobe pulse. Additionally, every time an instruction finishes execution, the IXSTAT and IXQUAL signals indicate by how many bytes to advance the execution address. By looking at these signals the ICE system can do code tracing in almost real time. This mode is called "Aggressive Trace" because it guarantees the highest possible reliability of trace reporting, at a small cost in real-time performance: when an instruction branches to a cached address, it must wait for the off-chip bus to become available so that the target address can be reported. Outside of an ICE environment, it would not wait.

To run in actual real time, the Non-Aggressive Tracing Mode can be selected: in this mode, the NSF indication does not wait for the bus to become available on an Instruction Cache hit, and so branches are not guaranteed to present the target address on the SA pins.

In order to execute the ICE monitor code in the ICE Mapped memory it is necessary to get an ICE Exception. The ICE Exception is the highest-priority exception. It is triggered if the device is in ICE Mode and the BPREQ pin is activated. (Otherwise, activation of the BPREQ pin has no effect.) In addition, if the Debug Registers are in ICE Exception Mode (DR7 bit IM=1), execution of the ICEBP Instruction (opcode F1 hex), or any breakpoint triggered by the Debug Registers, or the Single Step Trap (from the TF bit in the EFLAGS register) causes an ICE exception.

If the Debug Registers are not configured for ICE Exception Mode, the ICEBP instruction and Debug Registers trigger the Debug Trap: Interrupt 1. The status of bit 12 of the DR6 register indicates whether the BPREQ signal is the cause of the ICE Exception.

The IM bit does not affect the two-byte INT 1 instruction (which triggers Interrupt 1 in all cases), nor does it affect any of the other INT instructions, including "INT 3" (which is a software "trap" instruction). It also does not affect the function of the BPREQ pin, which generates the ICE Exception in all cases.

From the point that the emulator begins to service the ICE Exception to the time that the ICE Monitor program returns program control to User code (RSM, below), neither another ICE Exception nor any Non-Maskable Interrupt (NM) is recognized. Any NMI request is held pending internally, and is serviced upon exit to Run Mode. Any additional BPREQ requests are to be held pending by off-chip circuitry until a BPREQ Acknowledge (from the ICE monitor) is seen; this also does not occur until the exit to User code.

Preferably, the ICE Monitor program disables the Watchdog feature on entry, and re-enables and services the Watchdog before returning to Run Mode. By doing this, Watchdog events are no more probable than in a non-ICE environment.

On occurrence of the ICE Exception, the entire machine state is stored into an ICE Dump Table starting at address 80000000 hex. Note that information is first dumped starting at address 80000100, and then comes back to 80000000. Values are stored in units of 32-bit double-words, and are right-justified with zero fill if they do not occupy the entire double-word. Contents of shadow registers are stored in two Dwords, preferably in a format that resembles the format of a memory segment descriptor.

After dumping the machine state, the processor core is brought to a state resembling Reset, except that the EIP register is loaded with the value 83FFFFF0. In this state, all internal shadow registers is set to a Base value of zero, and the maximum Segment Length (4 Gbyte). The processor is also placed in USE32 mode for code.

If the BPREQ input is activated during the exit from Reset, the service described above occurs immediately after normal Reset processing. Preferably, the BPREQ signal is not be removed until the IXSTAT/IXQUAL signals acknowledge that the ICE Exception has been entered.

In Break Mode, references to user-mapped memory data or code may use standard instructions, since the memory spaces are not disjoint. The code in the ICE Map is uncacheable; therefore, execution of code in Break Mode does not modify the instruction cache unless interrupts back into the User's code are allowed from the ICE system's monitor. Snooping on the bus continues, in order to invalidate any cache line to which a Write is performed in Break Mode. It is not necessary to invalidate the cache on entry to Break Mode.

To get back to Run Mode, the monitor causes the processor to execute an instruction RSM (Opcode 0F, AA hex), which causes the CPU's architectural registers and shadow registers to be loaded from the ICE Dump Table. Execution then continues from the point indicated by the restored EIP and CS images. Temporary registers are not restored at all.

If the RSM instruction is executed in Run Mode, it causes an "Invalid Instruction" trap.

The appendices attached hereto contain information about an integrated circuit in which the present invention has been implemented and are incorporated herein by reference.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, filed May 26, 1995, entitled "DISPLAY CONTROLLER CAPABLE OF ACCESSING AN EXTERNAL MEMORY FOR GRAY SCALE MODULATION DATA" PRECISION (64-BIT) SHIFT OPERATIONS USING A "32-BIT DATA PATH" (atty. docket no. NSC1-63600); U.S. patent application Ser. No. 08/451,571, filed May 26, 1995, entitled "METHOD FOR PERFORMING SIGNED DIVISION" (atty. docket no. NSC1-63700); U.S. patent application Ser. No. 08/452,162, filed May 26, 1995, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, filed May 26, 1995, entitled "AREA AND TIME EFFICIENT FIELD EXTRACTION CIRCUIT" (atty. docket no. NSC1-63900); U.S. patent application Ser. No. 08/451,535, now U.S. Pat. No. 5,617,543, filed May 26, 1995, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, filed May 26, 1995, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, now U.S. Pat. No. 5,546,353, entitled "PARTITIONED DECODER CIRCUIT FOR LOW POWER OPERATION" (atty. docket no. NSC1-64200); U.S. patent application Ser. No. 08/451,495, now U.S. Pat. Patent No. 5,649,147, filed May 26, 1995, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, filed May 26, 1995, entitled (atty. docket no. NSC1-62700); U.S. patent application Ser. No. 08/451,965, filed May 26, 1995, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, filed May 26, 1995, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, filed May 26, 1995, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, filed May 26, 1995, (abandoned) entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, now U.S. Pat. No. 5,655,139, filed May 26, 1995, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, now U.S. Pat. No. 5,652,718, filed May 26, 1995, entitled "BARREL SHIFTER" (atty. docket no. NSC1-63400); U.S. patent application Ser. No. 08/451,204, filed May 26, 1995, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, filed May 26, 1995, entitled "DOUBLE CIRCUIT FOR GENERATING A DEMAND-BASED GATED CLOCK" (atty. docket no. NSC1-64500); U.S. patent application Ser. No. 08/451,214, now U.S. Pat. No. 5,598,112, filed May 26, 1995, entitled "INCREMENTOR/DECREMENTOR" (atty. docket no. NSC1-64700); U.S. patent application Ser. No. 08/451,150, now U.S. Pat. No. 5,583,453, filed May 26, 1995, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, filed May 26, 1995, entitled "CODE BREAKPOINT DECODER" (atty. docket no. NSC1-64900); U.S. patent application Ser. No. 08/445,569, filed May 26, 1995, entitled "TWO TIER PREFETCH BUFFER STRUCTURE AND METHOD WITH BYPASS" (atty. docket no. NSC1-65000); U.S. patent application Ser. No. 08/445,564, filed May 26, 1995, entitled "INSTRUCTION LIMIT CHECK FOR MICROPROCESSOR" (atty. docket no. NSC1-65100); U.S. patent application Ser. No. 08/452,306, filed May 26, 1995, (abandoned), entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, filed May 26, 1995, entitled "APPARATUS AND METHOD FOR EFFICIENT COMPUTATION OF A $_{486}$™ MICROPROCESSOR COMPATIBLE POP INSTRUCTION" (atty. docket no. NSC1-65700); U.S. patent application Ser. No. 08/450,154, filed May 26, 1995, (abandoned), entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, filed May 26, 1995, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, now U.S. Pat. No. 5,659,712, filed May 26, 1995, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, filed May 26, 1995, (abandoned) entitled "DRAM CONTROLLER THAT REDUCES THE TIME REQUIRED TO PROCESS MEMORY REQUESTS" (atty. docket no. NSC1-66300); U.S. patent application Ser. No. 08/451,420, filed May 26, 1995, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, now U.S. Pat. No. 5,612,637, filed May 26, 1995, entitled "SUPPLY AND INTERFACE CONFIGURABLE INPUT/OUTPUT BUFFER" (atty. docket no. NSC1-66500); U.S. patent application Ser. No. 08/451,744, filed May 26, 1995, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, filed May 26, 1995, entitled "CONFIGURABLE POWER MANAGEMENT SCHEME" (atty. docket no. NSC1-66700); U.S. patent application Ser. No. 08/452,350, filed May 26, 1995, entitled "BIDIRECTIONAL PARALLEL SIGNAL INTERFACE" (atty. docket no. NSC1-67000); U.S. patent application Ser. No. 08/452,094, filed May 26, 1995, entitled "LIQUID CRYSTAL DISPLAY (LCD) PROTECTION CIRCUIT" (atty. docket no. NSC1-67100); U.S. patent application Ser. No. 08/450,156, filed May 26, 1995, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, now U.S. Pat. No. 5,541,935, filed May 26, 1995, entitled "INTEGRATED CIRCUIT WITH TEST SIGNAL BUSES AND TEST CONTROL CIRCUITS" (atty. docket no. NSC1-67600); U.S. patent application Ser. No. 08/445,568, filed May 26, 1995, entitled "DECODE BLOCK TEST METHOD AND APPARATUS" (atty. docket no. NSC1-68000)

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An in-circuit emulator for emulating native instruction execution of a target processor, comprising:

cache memory means for holding instructions prefetched from an external memory in accordance with a cache prefetch algorithm;

means associated with an execution means for accumulating instruction length; and means for tracking an instruction pointer including accumulated instruction length.

2. An in-circuit emulator as in claim 1, wherein the in-circuit emulator outputs a signal when processor instruction flow changes in a nonsequential manner.

3. An in-circuit emulator as in claim 1 having a plurality of modes of operation, wherein a first mode of operation provides aggressive tracing, and a second mode of operation provides for non-aggressive tracing;

wherein in the first mode when an instruction branches to a cached address, the in-circuit emulator must wait for a bus to become available so that a target address can be reported; and wherein in the second mode when an instruction branches the in-circuit emulator does not wait for the target address.

4. An in-circuit emulator as in claim 1, wherein the in-circuit emulator outputs a signal which corresponds to an instruction execution being completed by the target processor.

5. An in-circuit emulator as in claim 1, wherein the in-circuit emulator outputs a signal which corresponds to the length of a processor instruction.

6. A microprocessor which has an in-circuit emulator mode for emulating native instruction execution of the microprocessor, comprising:

means associated with an execution means for tracking instruction length; and means for tracking an instruction pointer including accumulated instruction length.

7. A microprocessor as in claim 6, wherein when operating in the in-circuit emulation mode, the microprocessor outputs a signal when an instruction flow changes in a non-sequential manner.

8. A microprocessor as in claim 7, wherein the debug logic implements in-circuit emulation support.

9. A microprocessor as in claim 6, wherein the microprocessor has a plurality of in-circuit emulation modes, wherein a first in-circuit emulation mode of operation provides aggressive tracing and a second in-circuit emulation mode of operation provides for non-aggressive tracing;

wherein in the first in-circuit emulator mode when an instruction branches to a cached address, the microprocessor waits for a bus to become available so that a target address can be reported; and wherein in the second in-circuit emulator mode when an instruction branches the microprocessor does not wait for the target address.

10. A microprocessor as in claim 6, wherein when operating in the in-circuit emulation mode, the microprocessor outputs a signal which corresponds to an instruction execution being completed by the microprocessor.

11. A microprocessor as in claim 6, wherein when operating in the in-circuit emulation mode, the microprocessor outputs a signal which corresponds to the length of an instruction.

12. A microprocessor as in claim 6 further comprising debug logic that implements instruction and data breakpoints.

* * * * *

UNITED STATES PATENT AND TRADEMARK OFFICE
CERTIFICATE OF CORRECTION

PATENT NO. : 5,857,094
DATED : January 5, 1999
INVENTOR(S) : MARIO D. NEMIROVSKY It is certified that error appears in the above-identified patent and that said Letters Patent is hereby corrected as shown below:

On the title page, item [54] and Column 1, delete "CLUSTRUCTION" and replace with -- INSTRUCTION -- .

In Col. 19, line 45, after "when" insert --a--.

In Col. 19, line 46, delete "nonsequential" and replace with --non-sequential--.

Signed and Sealed this

Thirtieth Day of March, 1999

Attest:

Q. TODD DICKINSON

*Attesting Officer*   Acting Commissioner of Patents and Trademarks